US012098689B2

(12) United States Patent
Kimura

(10) Patent No.: US 12,098,689 B2
(45) Date of Patent: Sep. 24, 2024

(54) THROTTLE DEVICE

(71) Applicant: AISAN KOGYO KABUSHIKI KAISHA, Obu (JP)

(72) Inventor: Yuichi Kimura, Kariya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 18/365,829

(22) Filed: Aug. 4, 2023

(65) Prior Publication Data

US 2024/0044295 A1 Feb. 8, 2024

(30) Foreign Application Priority Data

Aug. 5, 2022 (JP) ................................ 2022-125466

(51) Int. Cl.
*F02D 9/10* (2006.01)
*F02D 9/02* (2006.01)

(52) U.S. Cl.
CPC .... *F02D 9/1065* (2013.01); *F02D 2009/0269* (2013.01); *F02D 9/1005* (2013.01)

(58) Field of Classification Search
CPC ................. F02D 9/1065; F02D 9/1005; F02D 2009/0269
See application file for complete search history.

(56) References Cited

U.S. PATENT DOCUMENTS

| | | | | |
|---|---|---|---|---|
| 4,880,207 A * | 11/1989 | Matsumoto | F02D 9/10 | 267/155 |
| 6,860,466 B2 * | 3/2005 | Sakurai | F16K 1/221 | 310/91 |
| 6,863,259 B2 * | 3/2005 | Torii | F02D 11/10 | 251/355 |
| 6,918,374 B1 * | 7/2005 | Kurita | F02M 19/128 | 123/399 |
| 6,925,986 B2 * | 8/2005 | Cannone | F02D 9/1065 | 123/396 |
| 6,986,336 B2 * | 1/2006 | Tanimura | F02D 9/1065 | 123/343 |

(Continued)

FOREIGN PATENT DOCUMENTS

| | | | |
|---|---|---|---|
| JP | 2016166572 A * | 9/2016 | |
| JP | 2020033942 A * | 3/2020 | F02D 9/10 |

(Continued)

*Primary Examiner* — David Colon-Morales
(74) *Attorney, Agent, or Firm* — CONLEY ROSE, P.C.

(57) ABSTRACT

A throttle device includes a rotating member coupled to a throttle shaft and rotated by a drive source, and a coil spring interposed between a throttle body and the rotating member and configured to bias the throttle valve toward a default position. The coil spring has a first spring portion, a second spring portion, and an intermediate hook portion for connecting the first spring portion and the second spring portion. The rotating member includes an inner periphery supporting portion that supports an inner peripheral side of the first spring portion, an outer periphery supporting portion that supports an outer peripheral side of the first spring portion, and a blocking structure for preventing the first spring portion from being fitted to an outside of the outer periphery supporting portion when assembling the coil spring.

6 Claims, 11 Drawing Sheets

(56) References Cited

U.S. PATENT DOCUMENTS

| | | | | |
|---|---|---|---|---|
| 7,063,067 | B2 * | 6/2006 | Kado | F02D 9/1065 123/399 |
| 7,104,254 | B2 * | 9/2006 | Arai | F02D 9/106 123/376 |
| 7,210,451 | B2 * | 5/2007 | Ikeda | F02D 11/106 324/207.21 |
| 7,428,892 | B2 * | 9/2008 | Isogai | F16K 31/043 251/305 |
| 7,464,692 | B2 * | 12/2008 | Isogai | F16K 1/222 251/305 |
| 7,669,581 | B2 * | 3/2010 | Sasaki | F02M 26/70 123/399 |
| 8,448,627 | B2 * | 5/2013 | Kondo | F02D 9/105 123/399 |
| 9,617,924 | B2 * | 4/2017 | Park | F02D 11/10 |
| 10,428,889 | B2 * | 10/2019 | Higuchi | F16F 1/06 |
| 11,041,449 | B2 * | 6/2021 | Guiduzzi | F02D 9/1065 |
| 11,105,272 | B2 * | 8/2021 | Moriya | F02D 9/02 |
| 11,248,714 | B2 * | 2/2022 | Higuchi | F16K 31/043 |
| 11,346,291 | B2 * | 5/2022 | Ishihara | F02D 9/1065 |
| 11,846,247 | B2 * | 12/2023 | Sakakibara | F02D 11/10 |
| 2023/0111887 | A1 * | 4/2023 | Kokubu | F16K 31/535 251/129.11 |

FOREIGN PATENT DOCUMENTS

| | | | | |
|---|---|---|---|---|
| WO | WO-2020129849 | A1 * | 6/2020 | F02D 11/10 |
| WO | WO-2021176489 | A1 * | 9/2021 | F02D 9/02 |

* cited by examiner

THROTTLE DEVICE

CROSS-REFERENCE TO RELATED APPLICATIONS

This application claims priority to Japanese patent application serial number 2022-125466 filed Aug. 5, 2022, the contents of which are hereby incorporated herein by reference in its entirety for all purposes.

STATEMENT REGARDING FEDERALLY SPONSORED RESEARCH OR DEVELOPMENT

Not applicable.

BACKGROUND

The present disclosure relates generally to throttle devices for vehicles.

The throttle device of an automobile that regulates an amount of intake air supplied to an engine typically opens and closes an intake passage defined in a body by rotating a shaft fixed to a throttle valve (disc) using an electric motor. In many cases, such a throttle device is provided with a mechanism for shifting a throttle valve to a predetermined default position to ensure a certain amount of intake air, even when the power energization to the electric motor is cut off. For example, according to a throttle device disclosed in JP2020-033942A, a throttle valve is biased toward the default position by a coil spring (torsion spring). Specifically, the coil spring is mounted between a final gear of a gear train for transmitting the rotation of an electric motor to a shaft and a body of the throttle device.

The coil spring that biases the throttle valve toward the default position may be significantly eccentric at some parts of its loops depending on how the coil spring is mounted, and thus, a supporting member may be provided inside and outside of the coil spring to prevent the eccentricity. For example, in the above publication, an outer periphery supporting portion is provided in the gear for holding the loop that attempts to shift eccentrically from the outside of the coil spring. However, if such an outer periphery supporting portion is provided, the coil spring may be accidentally and undesirably attached to the outside of the outer periphery supporting portion when assembled to the gear.

SUMMARY

One aspect of the present disclosure is a throttle device including a throttle body that defines an intake passage, a throttle valve that opens and closes the intake passage, a throttle shaft coupled to the throttle valve, a rotating member coupled to the throttle shaft and rotated by a drive source, and a coil spring interposed between the throttle body and the rotating member to bias the throttle valve toward a default position. The coil spring may include a first spring portion having a first end, a second spring portion having a second end, and an intermediate hook portion connecting the first spring portion and the second spring portion. The first end is engaged to a first spring engaging portion provided in the rotating member. The second end is engaged to a second spring engaging portion provided in the throttle body. The intermediate hook portion is engaged to at least one of a first stopper provided at the rotating member and a second stopper provided at the throttle body. The throttle device further includes an inner periphery supporting portion provided in the rotating member or the throttle shaft. The inner periphery supporting portion is configured to support an inner peripheral side of the first spring portion. The throttle device further includes an outer periphery supporting portion provided in the rotating member. The outer periphery supporting portion is configured to support an outer peripheral side of the first spring portion. The rotating member has a blocking structure that prevents the first spring portion from being fitted into the outside of the outer periphery supporting portion when assembling the coil spring. This prevents the outer periphery supporting portion from being impaired in its ability to exert its effect as the coil spring is attached to the rotating member at the incorrect position.

In some embodiments, the blocking structure is located between the outer periphery supporting portion of the rotating member and the first spring engaging portion. This location prevents the first spring portion from being fitted at an incorrect position with respect to the outer periphery supporting portion, while the first end of the coil spring is engaged to the first spring engaging portion of the rotating member.

In some embodiments, the blocking structure is configured to prevent a first loop on the side of the first end of the first spring portion from being completely shifted to the outside of the outer periphery supporting portion when the intermediate hook portion is engaged to the first stopper, and while the first end of the coil spring is engaged to the first spring engaging portion of the rotating member. This configuration prevents the first spring portion from being attached at an incorrect position, even if a part of the first spring portion is significantly eccentric due to the force applied to the intermediate hook portion.

In some embodiments, the blocking structure is configured to prevent a first loop on the side of the first end of the first spring portion from being fitted in a position where passing by an outside of the outer periphery supporting portion, and while the first end of the coil spring is engaged to the first spring engaging portion of the rotating member and the first loop on the side of the first end of the first spring portion is in contact with an internal surface of the blocking structure. This configuration prevents the first spring portion from being attached at an incorrect position, even if a part of the first spring portion is significantly eccentric due to the force applied to the intermediate hook portion, when the coil spring is attached to the rotating member.

In some embodiments, the blocking structure protrudes axially from a base of the rotating member. The blocking structure includes an inner inclined surface that inclines inward from a top of the blocking structure toward the base of the rotating member. When the first spring portion is fitted to an outside of the outer periphery supporting portion, the inner inclined surface of the blocking structure prevents the first spring portion from being fitted at that position. Further, since the inner inclined surface is inclined outward toward the top of the blocking structure, at least a loop on the side of the intermediate hook portion of the first spring portion is prevented from sliding to the blocking structure.

In some embodiments, the first spring portion is an opener spring portion that operates when the throttle valve is closed to a degree greater than when the throttle valve is in the default position. The second spring portion is a return spring portion that operates when the throttle valve is open to a degree greater than when the throttle valve is in the default position. This prevents the opener spring portion from being attached at the incorrect position. In particular, when the number of loops of the opener spring portion is less than the number of loops of the return spring portion, the reaction force from the spring engaging portion is not easily dispersed to each loop of the opener spring portion, while the amount of eccentricity of each loop is prone to be significant when being attached or used, and the further closed side than the default position is prone to being used more frequently and operated more often. Therefore, it is believed that the importance of the above-mentioned outer periphery supporting portion and blocking structure will increase.

DETAILED DESCRIPTION

Hereinafter, various embodiments will be described with reference to the drawings.

Figure 1:
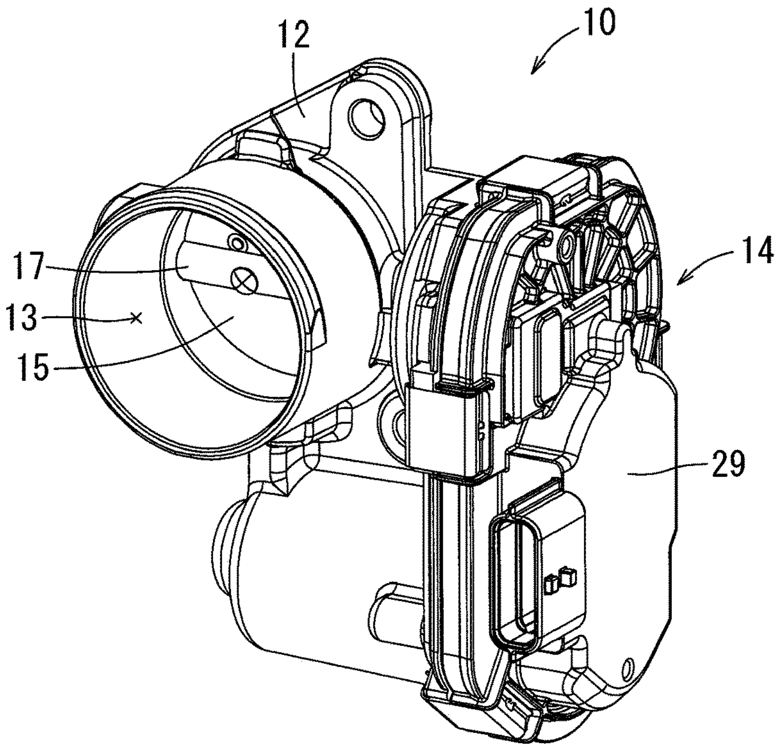
FIG. 1 is a perspective view of an embodiment of a throttle device in accordance with principles described herein.
Figure 2:
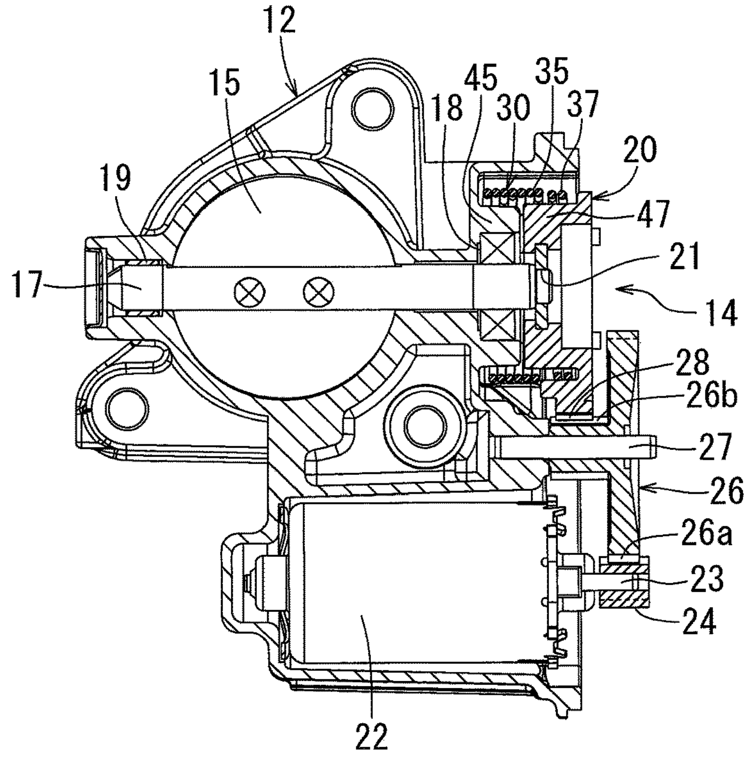
FIG. 2 is a cross-sectional view of the throttle device of FIG. 1 shown in a plane passing through a motor and a throttle shaft.
Figure 3:
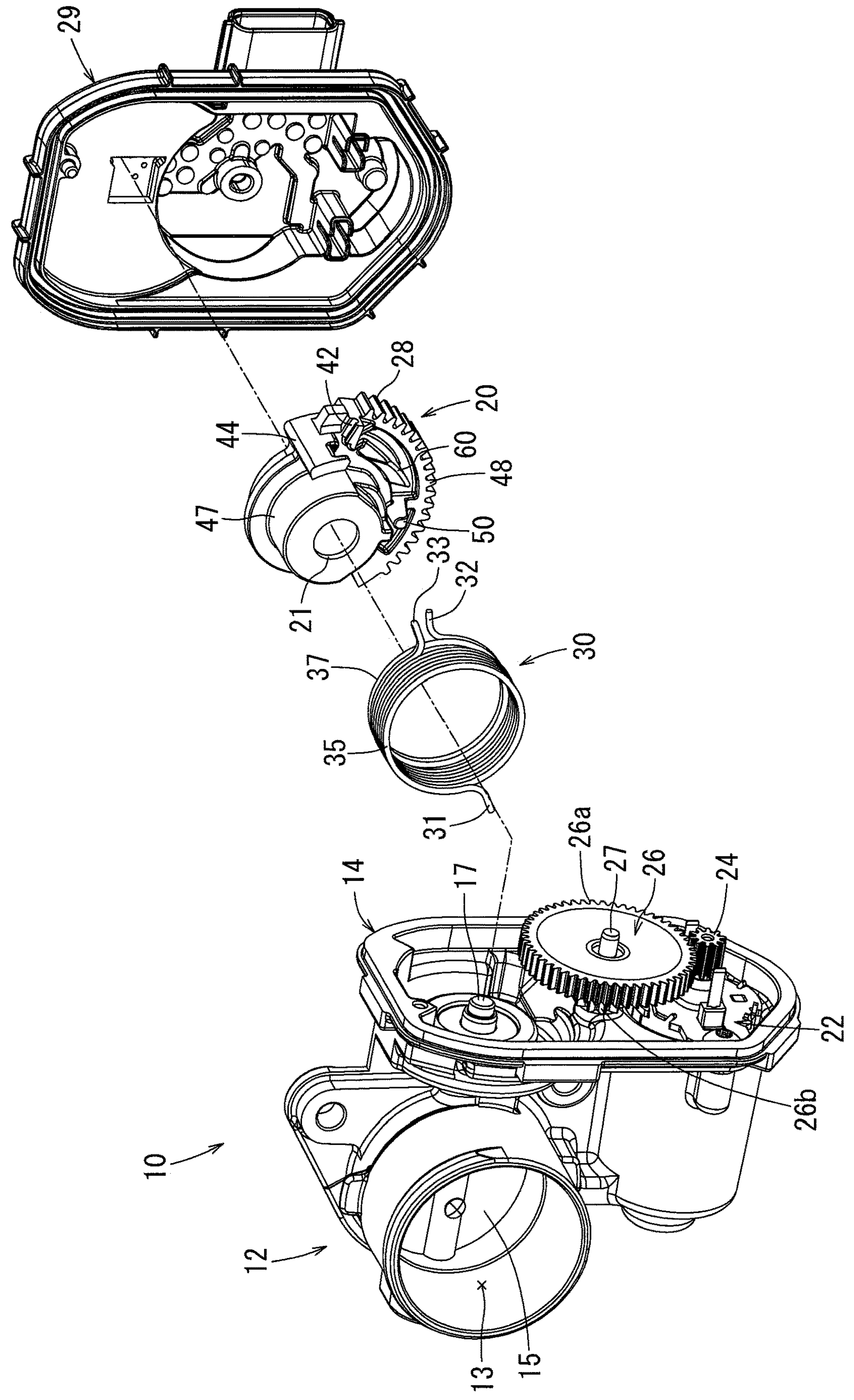
FIG. 3 is an exploded view of the throttle device of FIG. 1.

FIGS. 1 to 3 illustrate an embodiment of a throttle device 10 for adjusting an amount of air intake to the engine mounted on a vehicle such as an automobile. The throttle device 10 includes a throttle body 12 including an intake passage 13. The throttle body 12 may be made of metal or resin with a metal core. The throttle device 10 also includes a rotatable disc-shaped throttle valve (disc) 15 configured to rotate within the intake passage 13 to adjust the flow rate of air passing through the intake passage 13. The throttle valve 15 is fixably attached to a throttle shaft 17 rotatably supported by bearings 18 and 19, which are attached to the throttle body 12 on both sides of the intake passage 13. The throttle valve 15 is rotatable from a fully closed position (FIG. 7) with the valve 15 oriented substantially perpendicular to the intake passage 13 to a fully open position (FIG. 8) with the valve 15 oriented substantially parallel to the intake passage 13. The throttle valve 15 opens and closes as the throttle shaft 17 rotates. Both the throttle valve 15 and the throttle shaft 17 may be made of metal.

The throttle device 10 includes a motor 22 for driving the rotation of the throttle valve 15. In particular, the rotation output by the motor 22 is transmitted to the throttle shaft 17 via a transmission mechanism. The motor 22 and the transmission mechanism are housed in a housing defined by the throttle body 12, and the throttle body 12 includes a cover 29 that closes the housing. As one exemplary embodiment, the transmission mechanism includes a drive gear 24 fixed to an output shaft 23 of the motor 22, an intermediate gear 26 rotatably supported on the throttle body 12 via an intermediate shaft 27, and a throttle gear 20, which is a driven gear coaxially aligned with and fixably attached to the throttle shaft 17. The intermediate gear 26 has a large diameter toothed portion 26*a* and a small diameter toothed portion 26*b* coaxially aligned with and fixably attached to the intermediate shaft 27. The drive gear 24 is meshed to the large diameter toothed portion 26*a* of the intermediate gear 26. Teeth 28 of the throttle gear 20 are meshed to the small diameter toothed portion 26*b* of the intermediate gear 26. The throttle gear 20 may be made of resin. The throttle shaft 17 is inserted into a mounting hole 21 formed in the throttle gear 20 and fixed by caulking the end. The motor 22 is controlled by an external electronic control unit (ECU). The opening angle of the throttle valve 15 is adjusted by controlling the rotation direction and the rotation amount of the motor 22.

Figure 6:
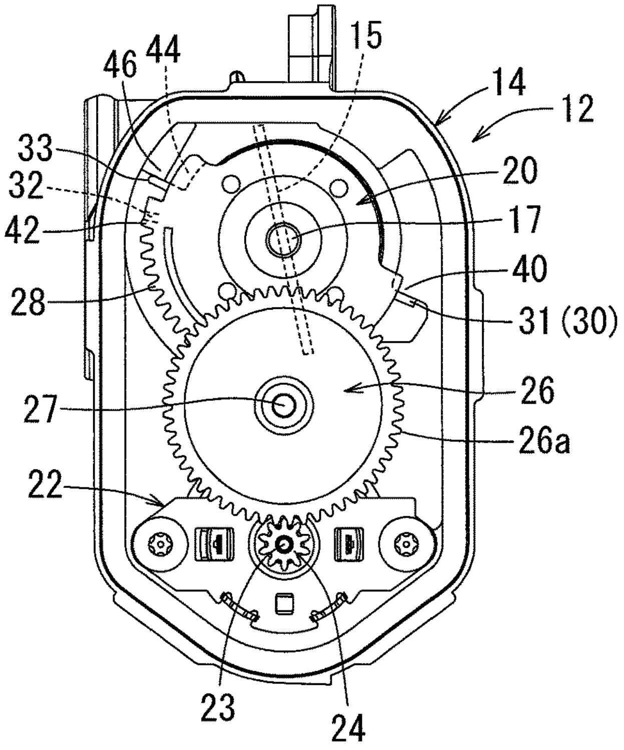
FIG. 6 is a front view of the housing of the throttle device of FIG. 1 with the cover open and with the throttle valve in the default position.
Figure 7:
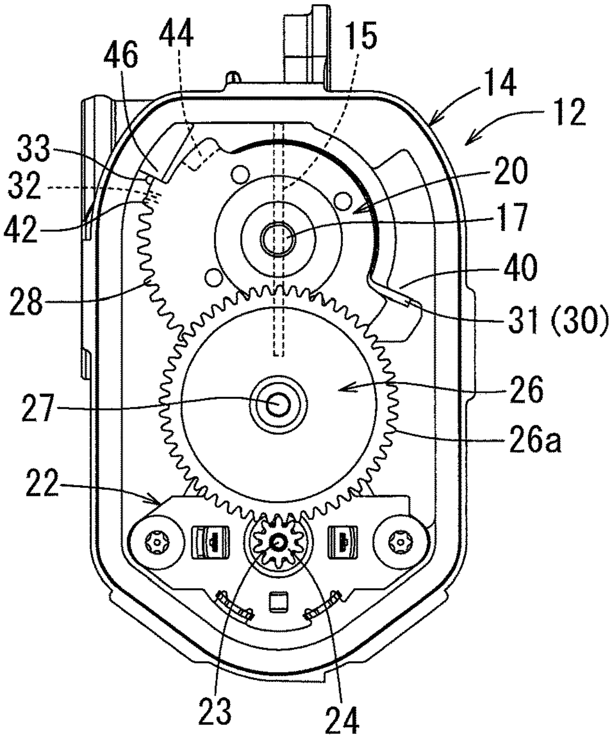
FIG. 7 is a front view of the housing of the throttle device of FIG. 1 with the cover open and with the throttle valve in the fully closed position.

As shown in FIGS. 2 and 3, the throttle device 10 includes a coil spring 30 that biases the throttle valve 15 toward a predetermined default position (FIG. 6) that is a slightly open position from the fully closed position (FIG. 7). The coil spring 30 functions as a torsion spring. When the motor 22 is energized (that is, when the output shaft 23 can be controlled), the throttle valve 15 can be rotated to any position between the fully closed position (FIG. 7) and the fully open position (FIG. 8) against the biasing force of the coil spring 30. However, when the energization to the motor 22 is cut off, the throttle valve 15 is automatically rotated to the default position by the biasing force of the coil spring 30, such that a small amount of air can be supplied to the engine through the intake passage 13.

Specifically, the coil spring 30 includes a return spring portion 35 (for example, approximately six loops) and an opener spring portion 37 (for example, approximately two loops) that are wound in opposite directions. The coil spring 30 is interposed between the throttle body 12 and the throttle gear 20. Both ends 31 and 32 of the coil spring 30 are bent so as to protrude outward in the radial direction. One end 31 is engaged with a body-side spring engaging portion 40 of the throttle body 12. The other end 32 is engaged with a gear-side spring engaging portion 42 of the throttle gear 20. The end 31 engaged to the throttle body 12 is also an end of the return spring portion 35. The end 32 engaged to the throttle gear 20 is also an end of the opener spring portion 37.

Figure 5:
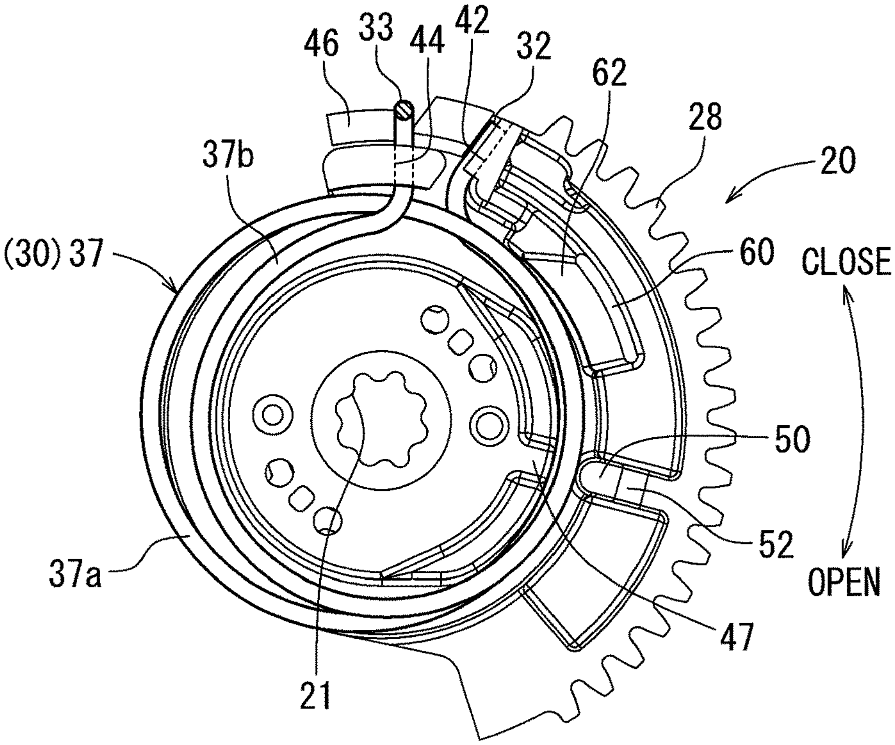
FIG. 5 is a front view of the throttle gear of FIG. 4 with an opener spring portion of a coil spring attached, and with the coil spring cut at an intermediate hook portion.

As shown in FIGS. 3 and 5, a connection between the return spring portion 35 and the opener spring portion 37 is a U-shaped folded portion. The folded portion is bent so as to protrude outward in the radial direction. The bent folded portion engages at least one of a gear-side stopper 44 of the throttle gear 20 and a body-side stopper 46 of the throttle body 12 as an intermediate hook portion 33. When the throttle gear 20 is in the default position (FIG. 6), the intermediate hook portion 33 engages both the gear-side stopper 44 of the throttle gear 20 and the body-side stopper 46 of the throttle body 12. At this time, both the return spring portion 35 and the opener spring portion 37 are twisted in a diameter-reducing direction from a relaxed, natural state to a preloaded state (a state in which elastic energy is accumulated and stored).

As shown in FIGS. 6-7, when the throttle gear 20 attempts to rotate from the default position toward the fully closed position by driving the motor 22, the intermediate hook portion 33 of the coil spring 30 engages the body-side stopper 46 of the throttle body 12, and thus, the bias of the return spring portion 35 is free from the throttle gear 20 because both ends of the return spring portion 35 are restricted by the throttle body 12. On the other hand, since the throttle gear 20 rotates relatively to the throttle body 12 while the intermediate hook portion 33 engages the body-side stopper 46, the gear-side stopper 44 of the throttle gear 20 moves away from the intermediate hook portion 33. Since the throttle gear 20 rotates while holding the end 32 of the coil spring 30, the opener spring portion 37 is twisted further in the diameter-reducing direction. If the energization to the motor 22 is cut off when the throttle gear 20 is on the side of the fully closed position rather than the default position, the throttle gear 20 is returned to the default position due to the biasing force of the opener spring portion 37.

Figure 8:
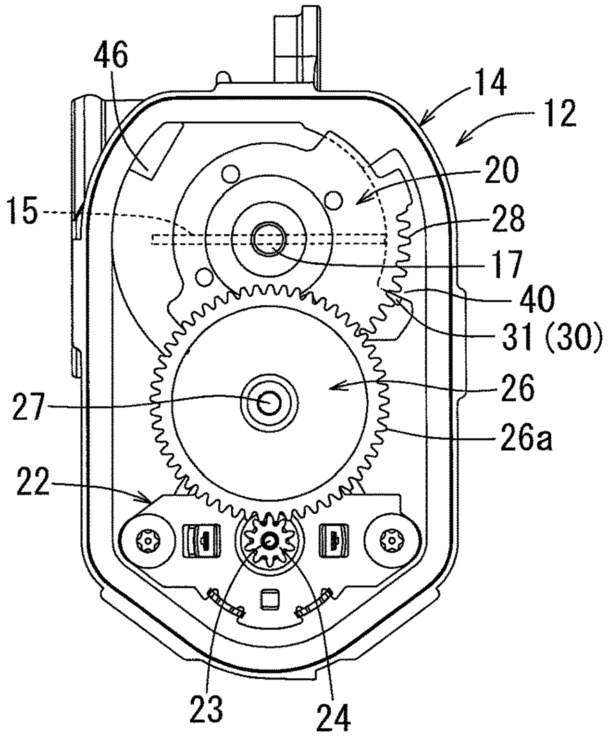
FIG. 8 is a front view of the housing of the throttle device of FIG. 1 with the cover open and the throttle valve in the fully open position.

As shown in FIGS. 6 and 8, when the throttle gear 20 rotates from the default position toward the fully open position by driving the motor 22, the intermediate hook portion 33 remains engaged to the gear-side stopper 44 of the throttle gear 20, and thus, the bias of the opener spring portion 37 is free from the throttle gear 20 because both ends of the opener spring portion 37 are engaged with the throttle gear 20. On the other hand, since the throttle gear 20 rotates relative to the throttle body 12 while the intermediate hook portion 33 engages the gear-side stopper 44, the return spring portion 35 is twisted further in a diameter-reducing direction. If the energization to the motor 22 is cut off when the throttle gear 20 is on the side of the fully open position rather than the default position, the throttle gear 20 is returned to the default position due to the biasing force of the return spring portion 35.

Referring still to FIGS. 6 and 8, when the throttle gear 20 rotates between the default position and the fully closed position, the opener spring portion 37 is twisted; however, the rotation amount of each part of the coil wire of the opener spring portion 37 is not uniform. For example, since a part of the opener spring portion 37 close to the end 32 and held by the throttle gear 20 rotates following the throttle gear 20, the relative rotation amount with respect to the throttle gear 20 is small. On the other hand, the relative rotation amount with respect to the throttle gear 20 increases, since a part of the opener spring portion 37 close to the intermediate hook portion 33 and restricted by the body-side stopper 46 has a smaller rotation amount with respect to the throttle body 12.

Figure 4:
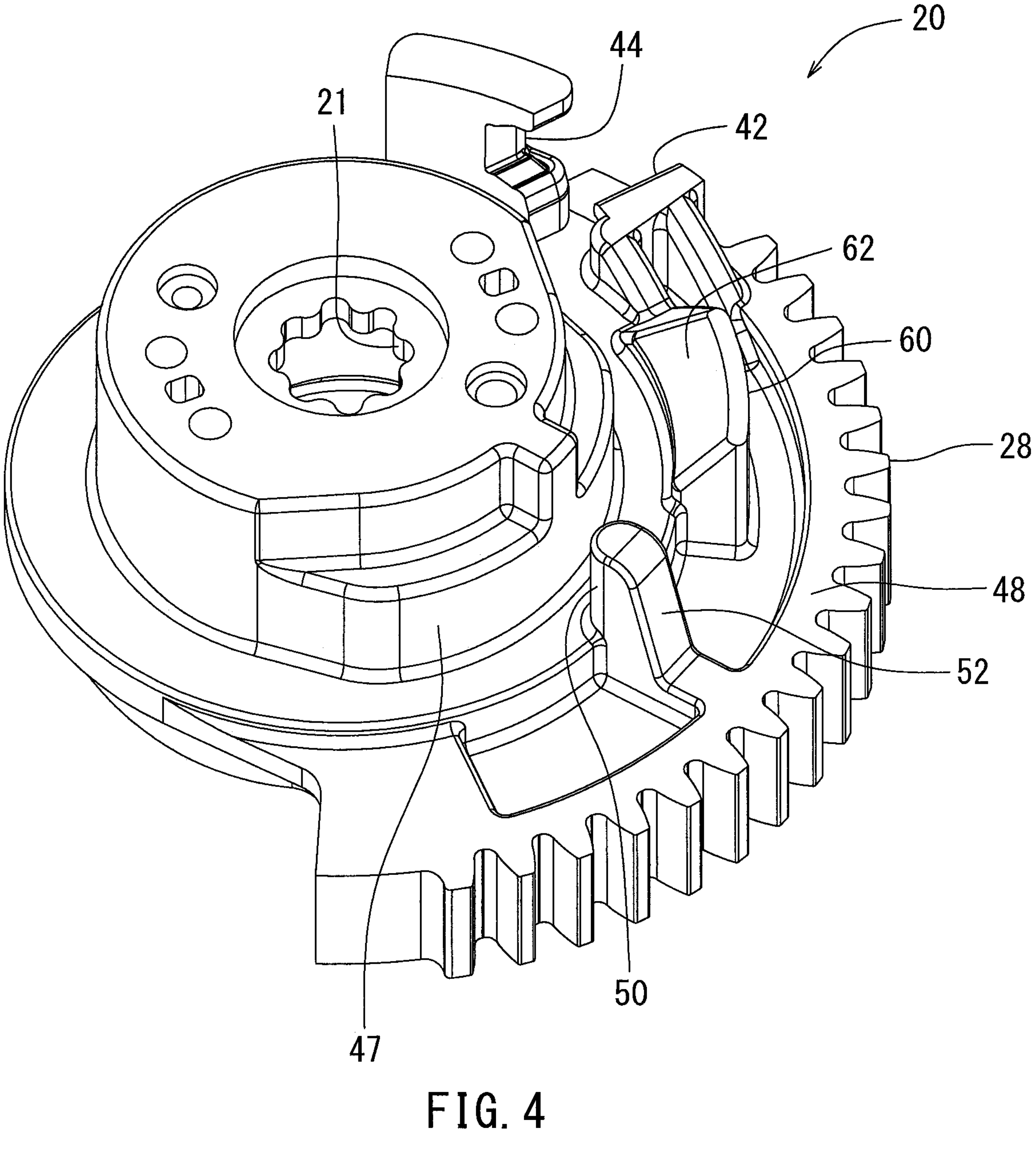
FIG. 4 is a perspective view of the throttle gear of the throttle device of FIG. 1.

As shown in FIGS. 4 and 5, the throttle gear 20 has an inner periphery supporting portion 47 that protrudes radially toward the inside of the coil spring 30 and prevents the coil spring 30 from being eccentric. As one example, the inner periphery supporting portion 47 is formed as a tubular portion protruding from a plate-shaped base on which the teeth 28 of the throttle gear 20 are formed. The above-described mounting hole 21 for fixing the throttle shaft 17 may be formed into a metal plate bonded to the inside of the tubular inner periphery supporting portion 47 by insert molding. The inner periphery supporting portion 47 has a height that passes through at least the opener spring portion 37, and may also have a height so as to project inside of the return spring portion 35 (for example, from the intermediate hook portion 33 up to approximately two loops of the return spring portion 35).

Figure 9:
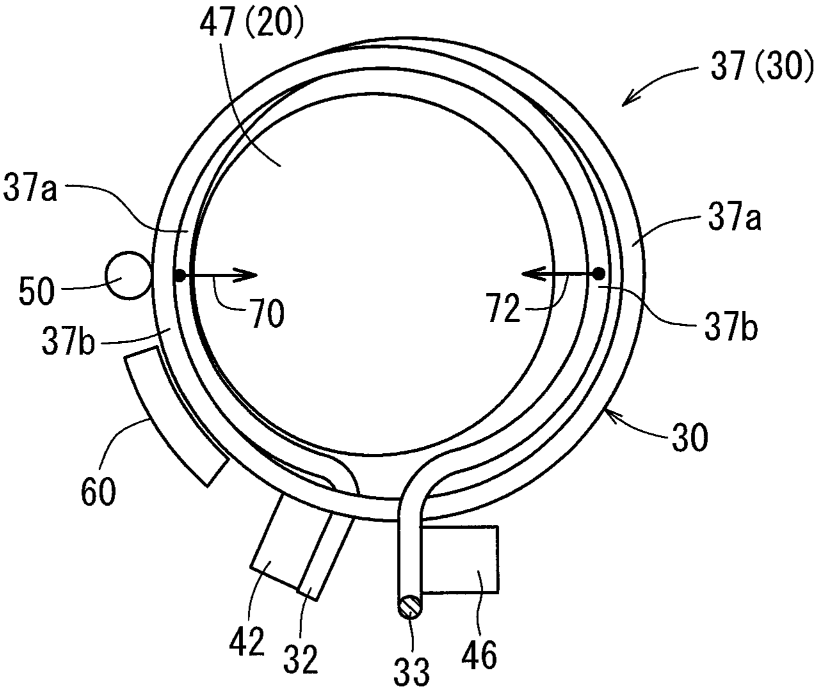
FIG. 9 is a front view of the eccentric opener spring portion and the outer peripheral support portion of the throttle device of FIG. 1 as viewed in an axial direction.
Figure 10:
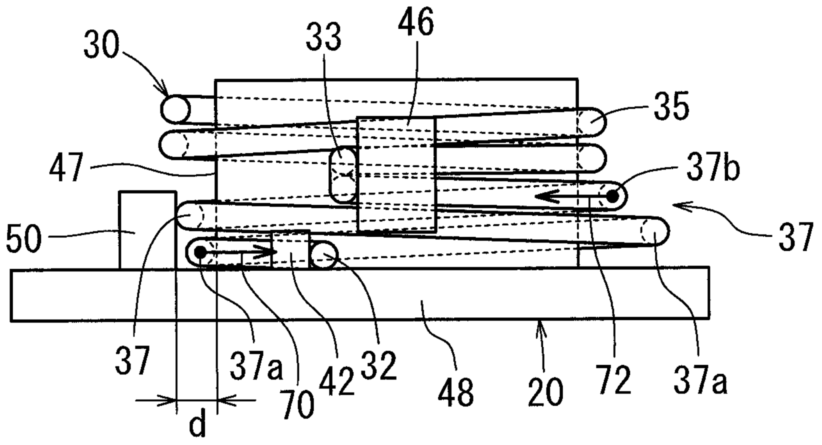
FIG. 10 is a side view of the eccentric opener spring portion and the outer periphery supporting portion of the throttle device of FIG. 1.

As schematically illustrated in FIGS. 9 and 10, since the opener spring portion 37 is mounted while being twisted in a diameter-reducing direction in a preloaded state, a loop **37*a* on the side of the end 32 of the opener spring portion 37 seeks an eccentric configuration in substantially the same direction (arrow 70) as the reaction force is applied from the gear-side spring engaging portion 42 with respect to the axis of the throttle gear 20. The inner periphery supporting portion 47 supports the inner peripheral side of the loop 37*a* on the side of the end 32 of the opener spring portion 37. The inner periphery supporting portion 47 also prevents the coil spring 30 from being eccentric in response to being twisted due to the rotation of the throttle gear while the throttle device 10** is operating.

As another exemplary embodiment (not shown), an inner peripheral support similar to the inner periphery supporting portions 47 may also be formed on the throttle shaft 17 instead of the throttle gear 20.

As shown in FIG. 2, the throttle body 12 has a bearing holding portion 45 that holds the bearing 18 closer to the throttle gear 20. The bearing holding portion 45 may be formed with a length that protrudes inside of the return spring portion 35, and the bearing holding portion 45 may function as an inner periphery supporting portion with respect to the return spring portion However, the inner periphery supporting portion simply refers to the inner periphery supporting portion 47 with respect to the opener spring portion 37.

As shown in FIGS. 4 and 5, the throttle gear 20 includes at least one outer periphery supporting portion 50 in contact with the outer peripheral side of the opener spring portion 37 of the coil spring 30. The outer periphery supporting portion 50 is integrally formed with the throttle gear 20. As one exemplary embodiment, the outer periphery supporting portion 50 extends from the base 48 on which the teeth 28 of the throttle gear 20 are formed to the same side as the inner periphery supporting portion 47. For example, the outer periphery supporting portion 50 may have a shape that contacts the opener spring portion 37, may have a cylindrical shape, and extend parallel to the axial direction of the throttle gear 20.

Figure 11:
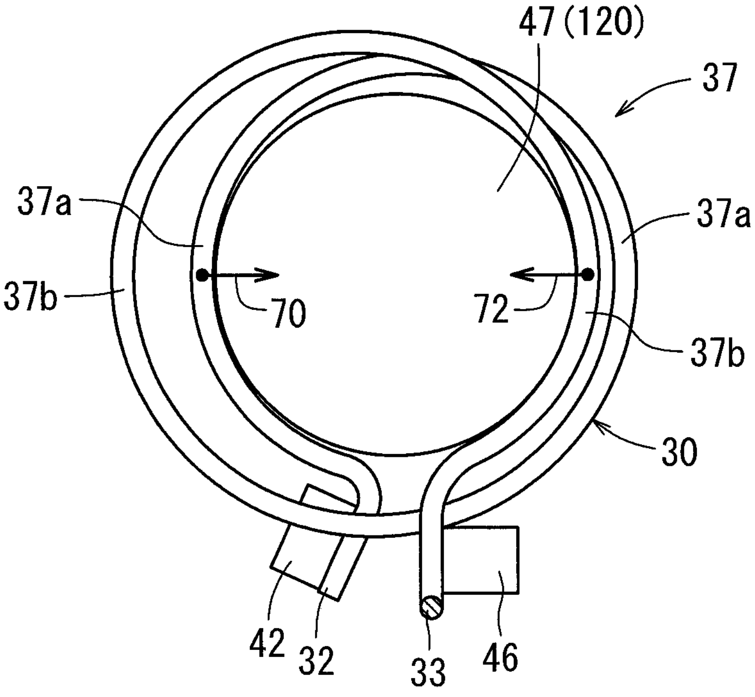
FIG. 11 is a front view of the eccentric opener spring portion of the coil spring of the throttle device of FIG. 1 without an outer periphery supporting portion as viewed in the axial direction.
Figure 12:
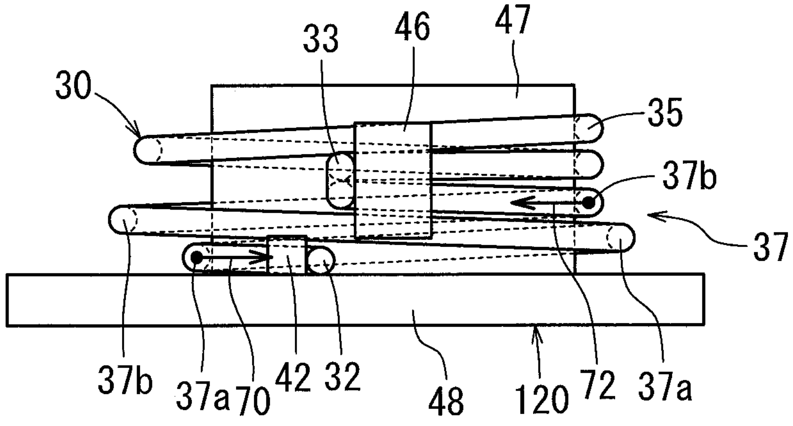
FIG. 12 is a side view of the eccentric opener spring portion of FIG. 11.

FIGS. 11 and 12 schematically illustrate a throttle gear 120 formed without the outer periphery supporting portion 50. If the throttle gear 120 is used, since a preload is applied to the opener spring portion 37, the loop **37*b* on the side of the intermediate hook portion 33 of the opener spring portion 37 is significantly shifted eccentrically toward the axis of the throttle gear in substantially same direction (arrow 72) as the reaction force is applied from the body-side stopper 46. In particular, since the number of loops (approximately 2 loops) of the opener spring portion 37 is relatively small, the reaction force applied from the body-side stopper 46 and the gear-side spring engaging portion 42 is not easily dispersed to each loop so that an amount of eccentricity of each loop of the opener spring portion 37 tends to be significant. Therefore, a part of the opener spring portion 37 close to the intermediate hook portion 33 (right side in the figure) is pressed against the inner periphery supporting portion 47, while a part on the opposite side (left side in the figure) is greatly separated from the inner periphery supporting portion 47. When the throttle gear 20 rotates from the default position toward the fully closed position, the opener spring portion 37 is further twisted in the diameter-reducing direction so that the force of the opener spring portion 37 that presses the inner periphery supporting portion 47 increases. When the throttle gear 20 rotates between the default position and the fully closed position, the relative rotation amount of the part of the opener spring portion 37 close to the intermediate hook portion 33 with respect to the throttle gear 20 is greater, since the intermediate hook portion 33 is restricted by the body-side stopper 46 as described above. Therefore, when this part of the opener spring portion 37 is pressed against the inner periphery supporting portion 47, friction is generated between the opener spring portion 37 and the inner periphery supporting portion 47 when the throttle gear 20 rotates, resulting in the rotational resistance of the throttle gear 20**.

On the other hand, as shown in FIGS. 9 and 10, in the case of the above-described embodiment in which the outer periphery supporting portion 50 is provided at the throttle gear 20, the outer periphery supporting portion 50 contacts the outer peripheral side of the loop 37*b* on the side of the intermediate hook portion 33 of the opener spring portion 37, thereby preventing the opener spring portion 37 from becoming eccentric. The loop 37*b* on the side of the intermediate hook portion 33 is separated from the inner periphery supporting portion 47 of the throttle gear 20. Therefore, the inner peripheral side of the loop 37*b* on the side of the intermediate hook portion 33 of the opener spring portion 37 is separated from the inner periphery supporting portion 47. Friction generated between the opener spring portion 37 and the inner periphery supporting portion 47 can be thus eliminated when the throttle gear 20 rotates between the default position and the fully closed position. This allows for a reduction in the friction of the inner periphery supporting portion 47 and the load on the motor 22 so that the downsizing of the motor 22 and the reduction in the reduction ratio of the transmission mechanism can be achieved, thereby allowing for the downsizing of the throttle device 10.

As another exemplary embodiment (not shown), the outer periphery supporting portion may be configured to reduce the force of the opener spring portion 37 to press the inner periphery supporting portion 47 instead of completely separating the loop 37*b* on the side of the intermediate hook portion 33 of the opener spring portion 37 from the inner periphery supporting portion 47. Specifically, it may be configured to press the opener spring portion 37 back in a direction opposite to the direction in which the opener spring portion 37 seeks to become eccentric (arrow 72 in FIG. 9). Consequently, friction generated between the opener spring portion 37 and the inner periphery supporting portion 47 can be reduced when the throttle gear rotates.

As shown in FIG. 5, the outer periphery supporting portion 50 may be configured to contact the loop 37*b* on the side of the intermediate hook portion 33 of the opener spring portion 37 at a position within a range of approximately 180 degrees to 360 degrees (for example, approximately 270 degrees) from the intermediate hook portion 33. As a result of such positioning, contact at a location where the relative rotation between the opener spring portion 37 and the inner periphery supporting portion 47 that is relatively large can be avoided, and friction therefore can be effectively reduced.

The distance from the axis of the throttle gear 20 to the outer peripheral surface of the inner periphery supporting portion 47 may not necessarily be constant. For example, the distance may be set large at a part of the outer peripheral surface of the inner periphery supporting portion 47 to support the loop 37*a* on the side of the end 32 of the opener spring portion 37, and may be set small at a part where the loop 37*b* on the side of the intermediate hook portion 33 of the opener spring portion 37 approaches the outer peripheral surface due to being eccentric.

As shown in FIG. 10, the minimum interval d between the inner periphery supporting portion 47 on which the opener spring portion 37 is arranged and the outer periphery supporting portion 50 may be less than two times of the diameter of the coil wire of the opener spring portion 37. This prevents the coil wires of the opener spring portion 37 from overlapping between the inner periphery supporting portion 47 and the outer periphery supporting portion 50, and stabilizes the position of the opener spring portion 37.

Figure 13:
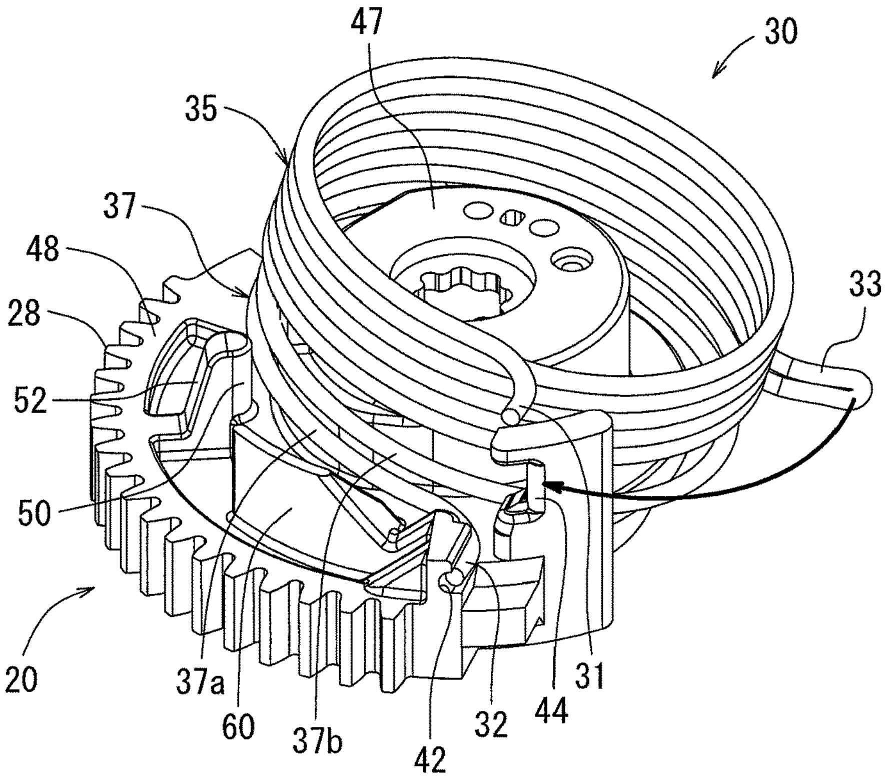
FIG. 13 is a perspective view of the coil spring of the throttle device of FIG. 1 about to be fit correctly inside of the outer periphery supporting portion while being attached to the throttle gear.

As shown in FIG. 13, in order to attach the coil spring 30 to the throttle gear 20, the intermediate hook portion 33 is engaged to the gear-side stopper 44 while twisting the opener spring portion 37 in the diameter reducing-direction after the end 32 is engaged to the gear-side spring engaging portion 42. The opener spring portion 37 is fitted between the inner periphery supporting portion 47 and the outer periphery supporting portion 50.

As shown in FIGS. 4 and 13, the throttle gear 20 includes a blocking structure 60 to prevent the coil spring 30 from being attached in the incorrect position. The blocking structure 60 may be a block extending from the base 48 of the throttle gear 20 to the same side as the periphery supporting portion 50. The blocking structure 60 is preferably positioned between the outer periphery supporting portion 50 of the throttle gear 20 and the gear-side spring engaging portion 42. As one specific example, the blocking structure 60 may be an arc-shaped block extending over an angular range of approximately 45 degrees as seen from the axis of the throttle gear 20.

Figure 14:
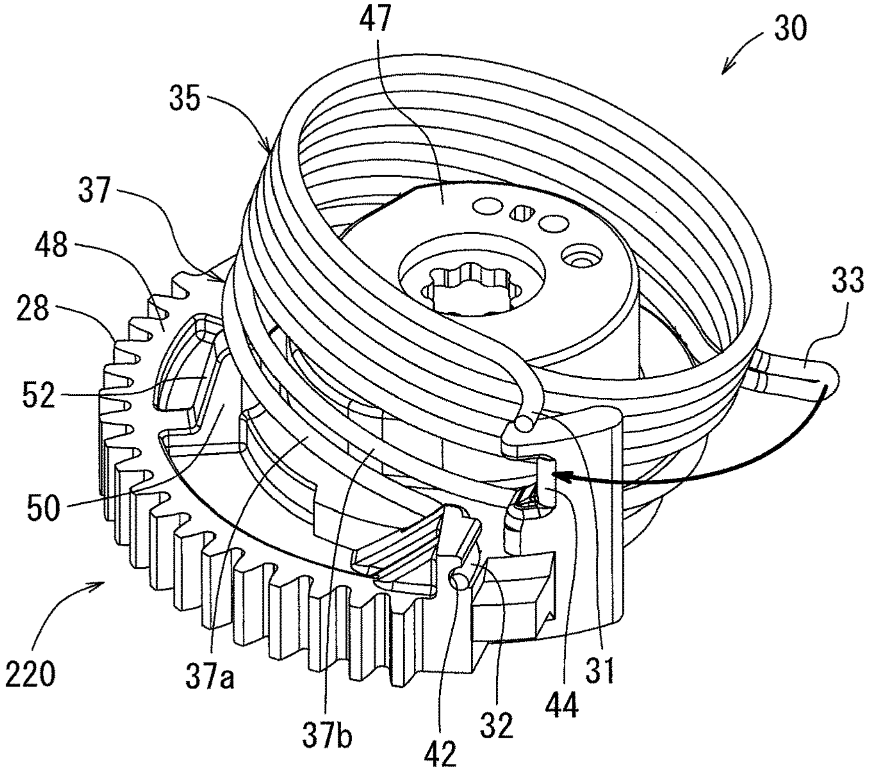
FIG. 14 is a perspective view of the coil spring of the throttle device of FIG. 1 that is about to be accidentally fit outside of the outer periphery supporting portion while attaching the coil spring to the throttle gear having no blocking structure.

FIG. 14 shows a throttle gear 220 that is formed without the blocking structure 60.

When the throttle gear 220 is used, the opener spring portion 37 moves over the outer periphery supporting portion 50 and is easily fitted outside in the process of attaching the coil spring 30. As described above, since the number of loops (approximately 2 loops) of the opener spring portion 37 is relatively small, the amount of eccentricity of each loop of the opener spring portion 37 increases at the time of assembly, which facilitates the spring portion 37 moving over the outer periphery supporting portion 50. When the opener spring portion 37 is attached at an incorrect position, the effect of the above-described outer periphery supporting portion 50 that separates the loop 37*b* on the side of the intermediate hook portion 33 of the opener spring portion 37 away from the inner periphery supporting portion 47 is not exhibited.

Figure 15:
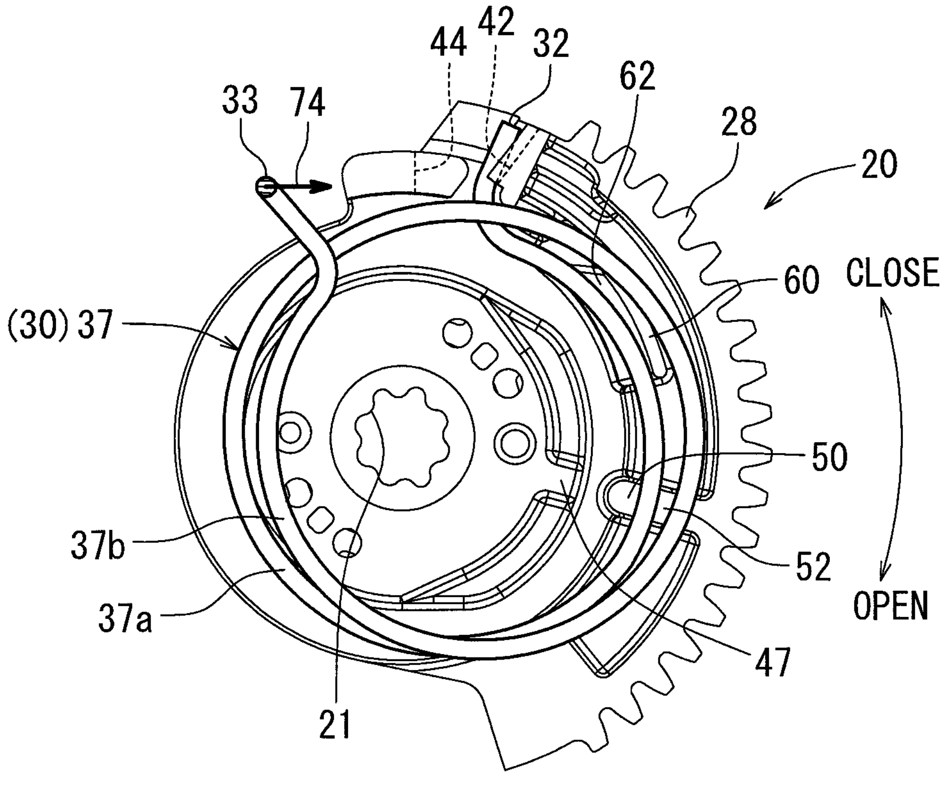
FIG. 15 is front view of the significantly eccentric coil spring of the throttle device of FIG. 1 while being attached to the throttle gear and the blocking structure that prevents its eccentricity as viewed in the axial direction.
Figure 16:
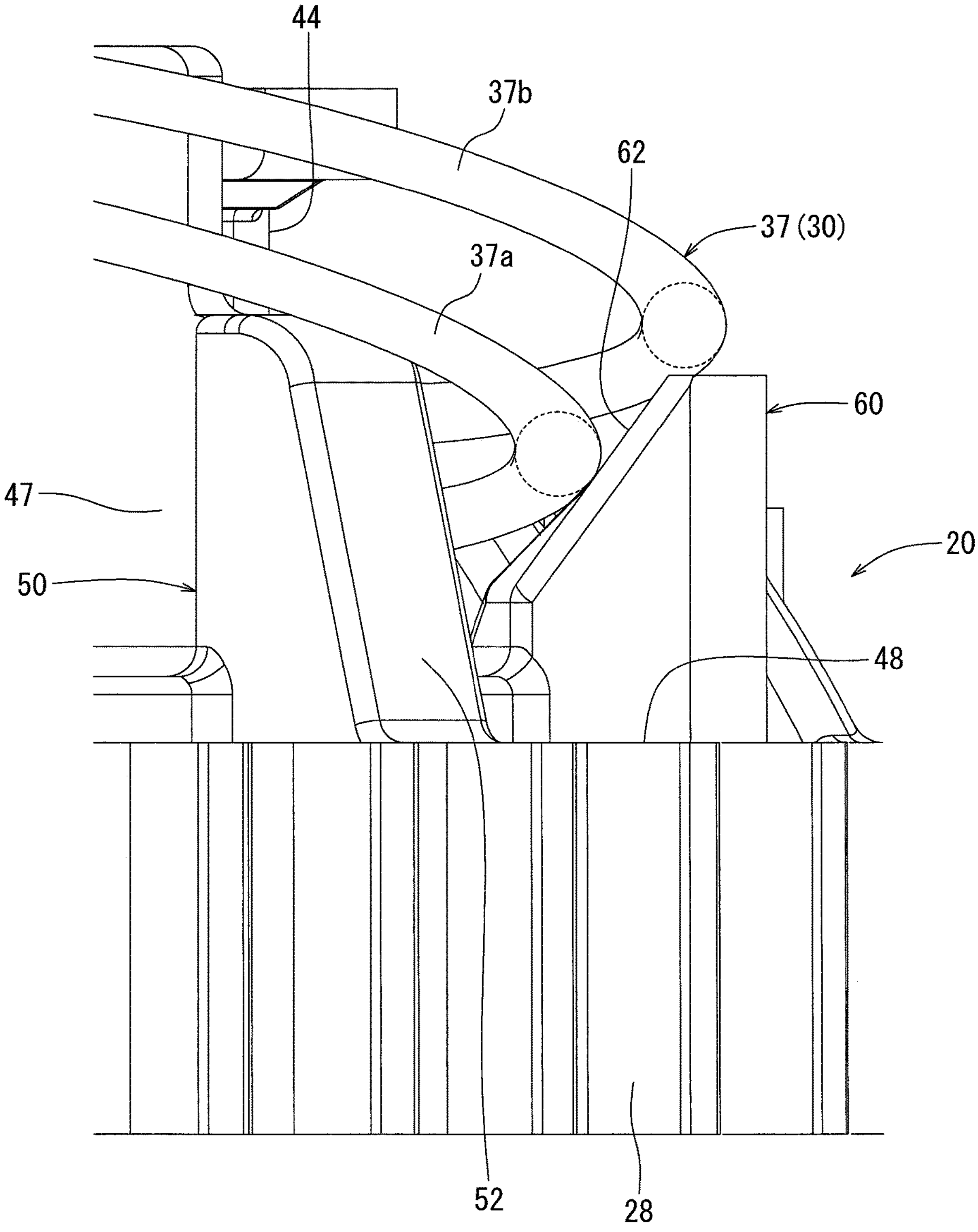
FIG. 16 is a side view of the opener spring portion of the coil spring of the throttle device of FIG. 1 that is not allowed to be fitted because it is engaged by an inner inclined surface of the blocking structure and the outer inclined surface of the outer periphery supporting portion.

On the other hand, when the blocking structure 60 is provided as shown in FIGS. 15 and 16, at least the loop 37*a* on the side of the end 32 of the opener spring portion 37 is prevented from moving completely to the outside of the outer periphery supporting portion 50, even if the opener spring portion 37 is significantly shifted eccentrically due to the force (arrow 74) applied to the intermediate hook portion 33 when the intermediate hook portion 33 engages the gear-side locking portion while the end 32 of the opener spring portion 37 engages the gear-side spring engaging portion 42 of the throttle gear 20. Further, under the condition that the end 32 of the coil spring 30 is engaging the gear-side spring engaging portion 42 of the throttle gear 20, the loop 37*a* on the side of end 32 of the opener spring portion 37 is not fitted at the position passing through the outside of the outer periphery supporting portion 50 while being in contact with the blocking structure 60. This prevents the opener spring portion 37 from being attached at an incorrect position, even when the loop 37*b* on the side of the intermediate hook portion 33 of the opener spring portion 37 is shifted so as to be significantly eccentric to the outside of the outer periphery supporting portion 50.

Figure 17:
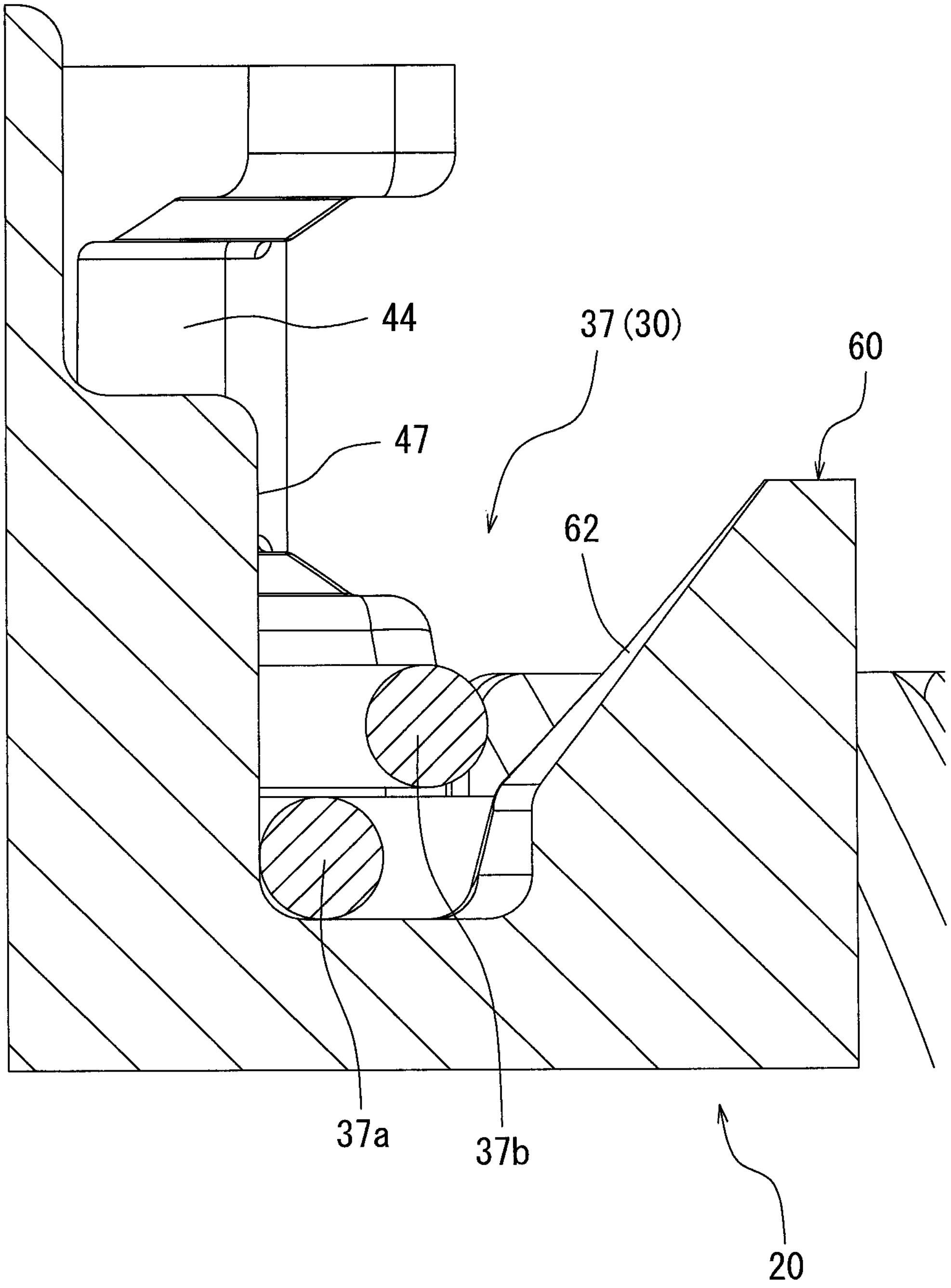
FIG. 17 is an enlarged cross-sectional view of the coil spring of FIG. 1 fitted inside the blocking structure.

As shown in FIG. 4, the blocking structure 60 may also be provided with an inner inclined surface 62 that inclines inward (inner periphery supporting portion 47 side) from the top of the blocking structure 60 toward the base 48 of the throttle gear 20. As shown in FIGS. 15 and 16, even if the opener spring portion 37 attempts to fit outside of the outer periphery supporting portion 50, the inner inclined surface 62 of the blocking structure 60 prevents the opener spring portion 37 from being fitted at that position. Further, as shown in FIG. 17, since the inner inclined surface 62 is outwardly inclined toward the top of the blocking structure 60, the loop 37*b* on the side of the intermediate hook portion 33 of the opener spring portion 37 is prevented from sliding to the blocking structure 60 when the throttle gear 20 rotates. When the opener spring portion 37 is correctly assembled to the throttle gear 20, the outer periphery supporting portion 50 contacts the outer peripheral side of the loop 37*b* at the intermediate hook portion 33 of the opener spring portion 37 to prevent from being eccentric of the opener spring portion 37. At this time, the blocking structure 60 does not contact the opener spring portion 37.

As shown in FIG. 4 and FIG. 16, the outer periphery supporting portion 50 may be provided with an outer inclined surface 52 that inclines inward from the base 48 of the throttle gear 20 toward the top of the outer periphery supporting portion 50. Therefore, even if the opener spring portion 37 attempts to fit outside of the outer periphery supporting portion 50, the outer inclined surface 52 of the outer periphery supporting portion 50 and the inner inclined surface 62 of the blocking structure 60 prevent the opener spring portion 37 from being fitted at such position. Also, the opener spring portion 37 easily returns to the correct position after moving over the inside and sliding on the outer inclined surface 52 of the outer periphery supporting portion 50 due to the force to twist the opener spring portion 37 further.

As another exemplary embodiment (not shown), a coil spring may be used for the coil spring 30 in a form of a mirror image to the one as illustrated, depending on the rotation direction required to open and close the throttle valve 15 and the direction of the throttle shaft 17 extending from the throttle valve 15. Even when the mirror image form is used, the return spring portion and the coil spring are still wound in opposite directions.

As yet another exemplary embodiment, the number of loops of the return spring portion 35 and the opener spring portion 37 of the coil spring 30 may be different from those illustrated in the drawings. As another exemplary embodiment, the relative size of the diameter of each loop of the return spring portion 35 and the opener spring portion 37 may also be set to a size differently from illustrated in the drawings.

As yet another exemplary embodiment, the first spring portion engaged to the throttle gear 20 among the two spring portions constituting the coil spring 30 may serve as a return spring portion, while the second spring portion engaged to the throttle body 12 may serve as an opener spring portion. In this case, the rotation direction of the throttle gear 20 when opening and closing the throttle valve 15 is opposite to the direction shown in FIG. 5. Even in such an embodiment, it is possible to prevent the return spring portion from being eccentric by providing an outer periphery supporting portion. Providing a blocking structure as described above prevents the return spring portion from being attached at an incorrect position with respect to the throttle gear 20.

Although specific embodiments have been described above, the present technology shall not be limited to these embodiments, and those skilled in the art may make various substitutions, improvements, and modifications without departing from the gist of the present technology.

What is claimed is:

1. A throttle device, comprising:
- a throttle body including an intake passage, a throttle valve positioned in the intake passage and configured to open and close the intake passage;
- a throttle shaft coupled to the throttle valve;
- a rotating member coupled to the throttle shaft and configured to be rotated by a drive source;
- a coil spring interposed between the throttle body and the rotating member, wherein the coil spring biases the throttle valve toward a default position,
  - wherein the coil spring includes a first spring portion having a first end, a second spring portion having a second end, and an intermediate hook portion connecting the first spring portion and the second spring portion; and
  - wherein the first end of the first spring portion engages a first spring engaging portion of the rotating member, the second end engages a second spring engaging portion of the throttle body, and the intermediate hook portion engages at least one of a first stopper of the rotating member and a second stopper of the throttle body;
- an inner periphery supporting portion provided of the rotating member or the throttle shaft configured to support an inner peripheral side of the first spring portion; and
- an outer periphery supporting portion of the rotating member configured to support an outer peripheral side of the first spring portion,
- wherein the rotating member includes a blocking structure configured to prevent the first spring portion from being fitted into an outside of the outer periphery supporting portion when assembling the coil spring.

2. The throttle device of claim 1, wherein the blocking structure is positioned between the outer periphery supporting portion of the rotating member and the first spring engaging portion.

3. The throttle device of claim 1, wherein the blocking structure is configured to prevent a first loop on a side of the first end of the first spring from being completely shifted to the outside of the outer periphery supporting portion when the intermediate hook portion engages the first stopper, and wherein the first end of the coil spring engages the first spring engaging portion of the rotating member.

4. The throttle device of claim 1, wherein the blocking structure is configured to prevent a first loop on a side of the first end of the first spring portion from being fitted into a position passing by the outside of the outer periphery supporting portion, wherein the first end of the coil spring engages the first spring engaging portion of the rotating member, and wherein the first loop on the side of the first end of the first spring portion is in contact with an internal surface of the blocking structure.

5. The throttle device of claim 1, wherein:

the blocking structure protrudes axially from a base of the rotating member, the blocking structure further includes an inner inclined surface, and the inner inclined surface of the blocking structure inclines inward from a top of the blocking structure toward the base of the rotating member.

6. The throttle device of claim 1, wherein:

the first spring portion is an opener spring portion configured to operate when the throttle valve is closed further than the default position, and the second spring portion is a return spring portion configured to operate when the throttle valve is open further than the default position.

* * * * *